(12) United States Patent
Joffe

(10) Patent No.: US 9,473,241 B1
(45) Date of Patent: Oct. 18, 2016

(54) SYSTEMS AND METHODS FOR CONTROLLING THE CONNECTIVITY OF A DROP CONNECTION

(71) Applicant: Daniel M. Joffe, Owens Crossroads, AL (US)

(72) Inventor: Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 14/792,176

(22) Filed: Jul. 6, 2015

(51) Int. Cl.
*H04J 14/00* (2006.01)
*H04B 10/27* (2013.01)
*H04B 10/2575* (2013.01)
*H04M 7/00* (2006.01)

(52) U.S. Cl.
CPC .......... *H04B 10/27* (2013.01); *H04B 10/2575* (2013.01); *H04M 7/0003* (2013.01)

(58) Field of Classification Search
CPC ... G08C 23/04; E05B 19/0082; E05B 47/00; E05B 81/64; E05B 81/56; E05B 2047/0088; H04B 10/807
USPC .......................................................... 398/66
See application file for complete search history.

(56) References Cited

U.S. PATENT DOCUMENTS

| | | | |
|---|---|---|---|
| 6,647,024 B1 | 11/2003 | Dombkowski et al. | |
| 6,665,404 B2* | 12/2003 | Cohen | H02J 1/102 370/494 |
| 6,898,280 B1 | 5/2005 | Dombkowski et al. | |
| 8,107,618 B2* | 1/2012 | Binder | H04M 19/08 379/387.01 |
| 8,411,696 B1* | 4/2013 | Ko | H04L 12/2861 370/386 |
| 8,818,192 B1* | 8/2014 | Smith | H04B 10/808 398/171 |
| 8,861,554 B1 | 10/2014 | Schneider et al. | |
| 8,963,367 B2* | 2/2015 | Melamed | H04L 12/10 307/18 |
| 9,350,447 B1 | 5/2016 | Detwiler et al. | |
| 2003/0133437 A1* | 7/2003 | Richarson | H04L 12/5601 370/352 |
| 2006/0203997 A1* | 9/2006 | Bailey | H04M 1/738 379/413 |
| 2007/0116256 A1* | 5/2007 | Ponganis | H04M 11/066 379/413 |
| 2010/0142689 A1* | 6/2010 | Hansen | H04B 3/50 379/93.36 |
| 2010/0150556 A1* | 6/2010 | Soto | H04M 19/08 398/66 |
| 2012/0236856 A1 | 9/2012 | Joffe et al. | |
| 2012/0250840 A1* | 10/2012 | Joffe | H04M 11/062 379/90.01 |
| 2012/0300817 A1* | 11/2012 | Smith | H04L 12/2892 375/219 |
| 2013/0251114 A1* | 9/2013 | Humphrey | H04M 1/738 379/30 |
| 2014/0050227 A1* | 2/2014 | Goodson | H04L 5/0058 370/442 |
| 2015/0071429 A1* | 3/2015 | Edwards | H04L 12/2869 379/324 |

\* cited by examiner

*Primary Examiner* — Juan A Torres
(74) *Attorney, Agent, or Firm* — Maynard Cooper & Gale, P.C.; Jon E. Holland

(57) ABSTRACT

A combination of algorithms and circuits can control the connectivity of a drop connection to either a telephone service or a high-speed data service at a distribution point. The algorithms and circuits can operate in the absence of a conventional power supply at the distribution point. The circuits can connect the drop connection to the high-speed data service in response to the receipt of an activation signal sent by equipment at the customer premises. After the connection to the high-speed data service is complete, the customer premises equipment can be used to apply back power to the components of the distribution point. If the customer premises equipment stops providing back power to the components of the distribution point, the circuits can connect the drop connection to the telephone service.

23 Claims, 4 Drawing Sheets

SYSTEMS AND METHODS FOR CONTROLLING THE CONNECTIVITY OF A DROP CONNECTION

BACKGROUND

Service providers want to cost effectively satisfy customer demand for high-speed data. One way to provide customers with high-speed data is through the use of a fiber optic connection. A Fiber to the Distribution Point (FTTDP) connection can provide a more cost effective alternative for providing high-speed data services to customers than a Fiber to the Home (FTTH) connection. In an FTTDP architecture, an optical termination unit is placed close to the customer, e.g., at a distribution point, and is connected to customer premises equipment (CPE) using one or more existing, very-short metallic drop wires to the customer. Reuse of the existing drop wires eliminates a significant component of fiber optic cable and fiber installation cost that would be present with an FTTH architecture. As the connection between the optical termination unit and the customer premises is short, very high-speed data can be carried with inexpensive, low power hardware.

Another component of the problem of delivering high-speed data derives from the installation expense. To lower the installation expense, the service provider wants to minimize the number of truck rolls, i.e., installer visits, required to install the service for a customer. Ideally, one truck roll would be sufficient to make the high-speed service available to a group of customers, even if none of the customers elect to have high-speed service at that time.

Before FTTDP is installed at the distribution point, a customer is likely receiving POTS (plain old telephone service) service over the drop wires. A service unit can be installed at the distribution point and connected to a fiber optic cable to provide FTTDP capabilities. The service unit can also terminate the drop wires and the POTS pairs from the central office. Initially, every customer should remain connected to their POTS service by an ohmic connection. As each customer requests high-speed data service, the customer's drop wire connection has to be reconfigured from POTS to high-speed data.

The switch to high-speed data would be straightforward if the service unit and distribution point were supplied with local power. However, to further decrease the cost of providing service, the service unit can be back-powered from the customer premises, using the same pairs, i.e., the drop wires, which previously provided the POTS service. When back-powering from the customer premises is used to power the service unit, the service unit will be unpowered before the first high-speed data service is activated. The service unit may also be unpowered after the first high-speed data service has been activated, as customers may remove back-powering at any time when they do not need high-speed data service.

Therefore, what is needed are systems and methods that can control the connectivity of the drop connection with very little or no steady local power available at the distribution point.

SUMMARY

The present application generally pertains to a combination of algorithms and circuits that control the connectivity of at least one drop wire to either a POTS service or a high-speed data service in the absence of a conventional power supply at the distribution point. The circuits to control connectivity of the drop connection can function without a conventional power supply being present at the distribution point and can remain resident on the drop wires without disrupting any of the drop wires' normal functions.

One advantage of the present application is that the algorithms provide a unique combination of simplicity with resistance to false activation.

Another advantage of the present application is that high-speed data service for the customer can be enabled without a truck roll to the distribution point.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
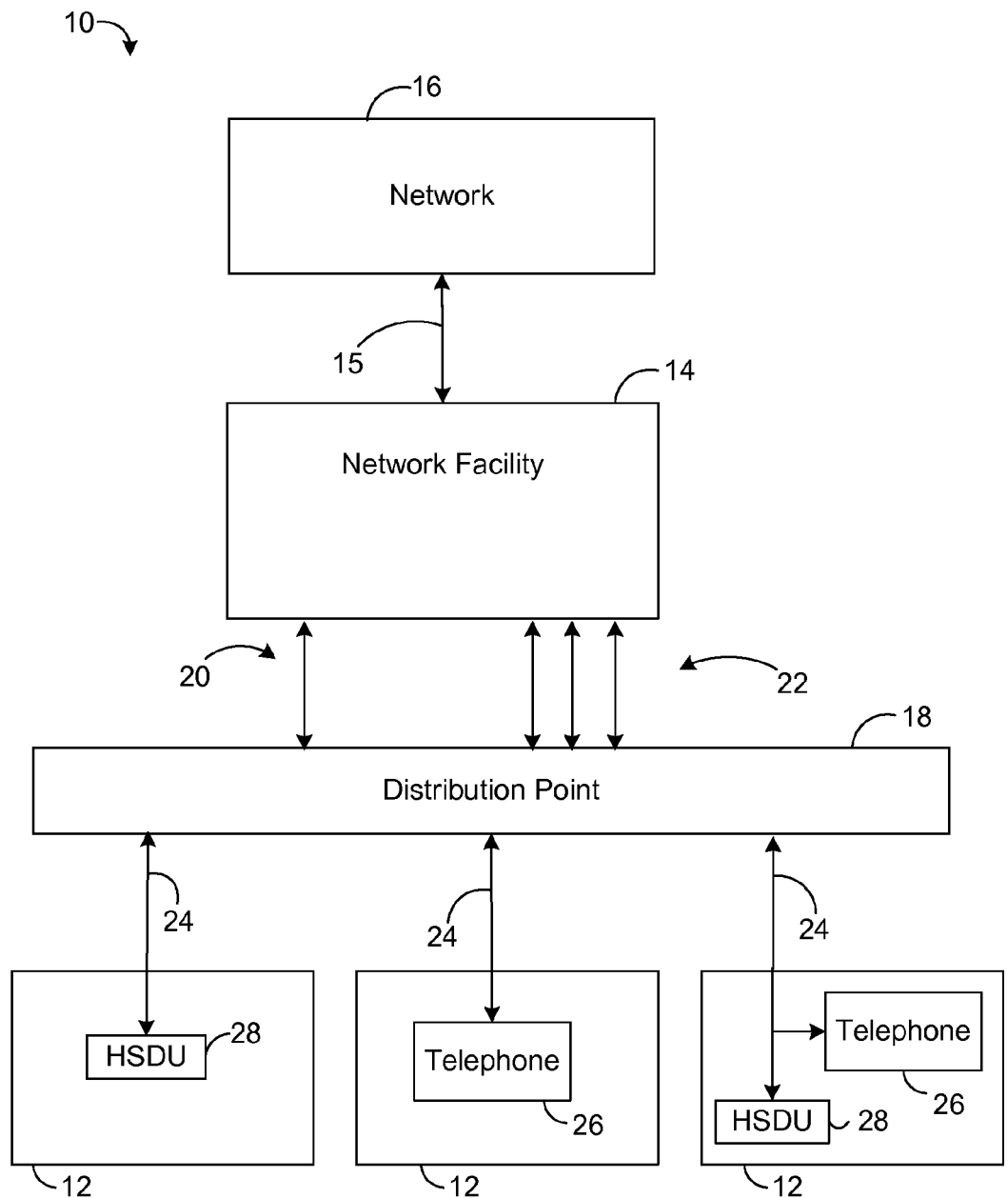
FIG. 1 is a block diagram showing an embodiment of a telecommunication system.

FIG. 1 shows a system 10 for communicating data and voice between several customer premises 12 and at least one network 16. The network 16 can include any of various types of telecommunication networks, such as the public switched telephone network (PSTN), local area networks (LANs), wide area networks (WANs), cellular networks, the Internet, or other types of networks known to carry telecommunication signals. The at least one network 16 can be connected to a network facility 14, such as a central office, by one or more connections 15. The network facility 14 can be connected to a distribution point (DP) 18 by at least one high-speed data connection 20, e.g., an optical fiber, and multiple POTS (plain old telephone service) lines 22. The high-speed data connection 20 provides a high-speed channel that carries a data stream between the DP 18 and the network facility 14. The POTS lines 22 provide voice channels between the DP 18 and the network facility 14. In one embodiment, there can be a POTS line 22 for each customer premises 12 connected to the DP 18. However, in other embodiments, the number of POTS lines 22 and the number of customer premises 12 connected to the DP 18 may not be same. Further, while the embodiment in FIG. 1 shows one DP 18 connected to the network facility 14 and three customer premises 12 connected to the DP 18, more than one DP 18 can be connected to the network facility 14 and more or less than three customer premises 12 can be connected to a DP 18.

As shown by FIG. 1, the DP 18 is connected or coupled to customer premises equipment (CPE) at one or more customer premises 12 via at least one conductive connection 24, such as a twisted-wire pair. The physical or conductive connection 24 from the DP 18 to customer premises 12 is typically referred to as a "drop connection." Each drop connection 24 can be connected to one or more CPE components, such as a telephone 26, a high-speed data unit (HSDU) 28, a fax machine (not shown), etc., located at the customer premises 12. The HSDU 28 can include a modem or any other type of device that can send and receive high-speed data over the drop connection 24.

Figure 2:
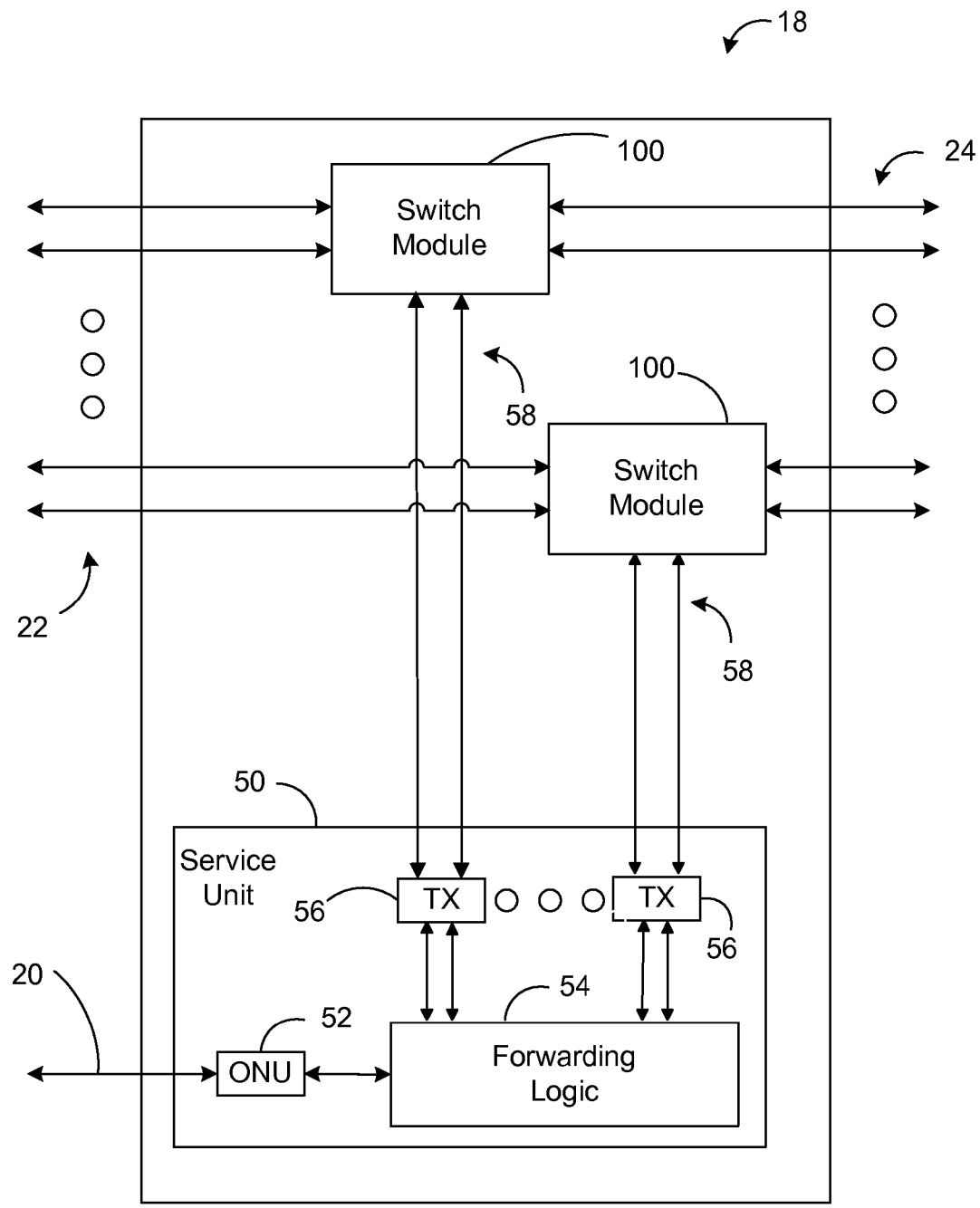
FIG. 2 is a block diagram showing an embodiment of a distribution point from the telecommunication system of FIG. 1.

FIG. 2 shows an embodiment of the DP 18 that has equipment for providing voice and/or high-speed data to customer premises 12. The DP 18 does not have a dedicated connection to a power supply, such as a battery or a line connection to an electric utility. The DP 18 can include a service unit 50 that is connected to the high-speed data connection 20. The service unit 50 can process data in both the downstream and upstream directions. In the downstream direction, the service unit 50 receives a high-speed data signal from the network 16 via high-speed data connection 20 and de-multiplexes the data for transmission across a plurality of subscriber lines. In the upstream direction, the service unit 50 receives a plurality of data streams from a plurality of subscriber lines and multiplexes the data into a high-speed data signal for transmission to network 16 via high-speed data connection 20.

The service unit 50 can include an optical network unit (ONU) 52 that can receive at least one packet flow from the high-speed data connection 20 and convert the received packet flow(s) from the optical domain to the electrical domain. The converted packet flow(s) can then be forwarded to forwarding logic 54 and then sent to the customer premises 12 using transceivers 56. The transceivers 56 can communicate using DSL (digital subscriber line) protocols, e.g., asymmetric DSL (ADSL), high-bit-rate DSL (HDSL), very-high-bit-rate DSL (VDSL), VDSL2, or G.fast, or other known protocols. The forwarding logic 54 can be configured to forward the data packets of the high-speed data stream from the ONU 52 to the transceivers 56 based on the destination addresses in the data packets such that each data packet is ultimately received by the CPE (e.g., the HSDU 28) identified by the packet's destination address. In one embodiment, the service unit 50 can be a DSL Access Multiplexer (DSLAM) connected to the high-speed data connection 20.

The transceivers 56 can use output lines 58 to connect to switch modules 100 located in the DP 18. The switch modules 100 can also be connected to POTS lines 22 and drop connections 24. Each switch module 100 can be configured to connect a corresponding drop connection 24 to either the POTS line 22 (if the customer has requested only telephone service) or the high-speed data service (HSDS) output line 58 connected to transceiver 56 (if the customer has requested high-speed data service). A customer receiving high-speed data service may also receive telephone service as part of the high-speed data service. The telephone service provided as part of the high-speed data service may be included as part of the high-speed data stream or may be provided at a different frequency band from the high-speed data stream. While the switch module 100 in FIG. 2 is shown separate from service unit 50, the switch module 100 can be incorporated into the service unit 50 in another embodiment.

In one embodiment, there can be a switch module 100 for each POTS line 22 connected to the DP 18. However, in other embodiments, only selected POTS lines 22 and/or selected output lines 58 may be connected to switch modules 100.

Figure 3:
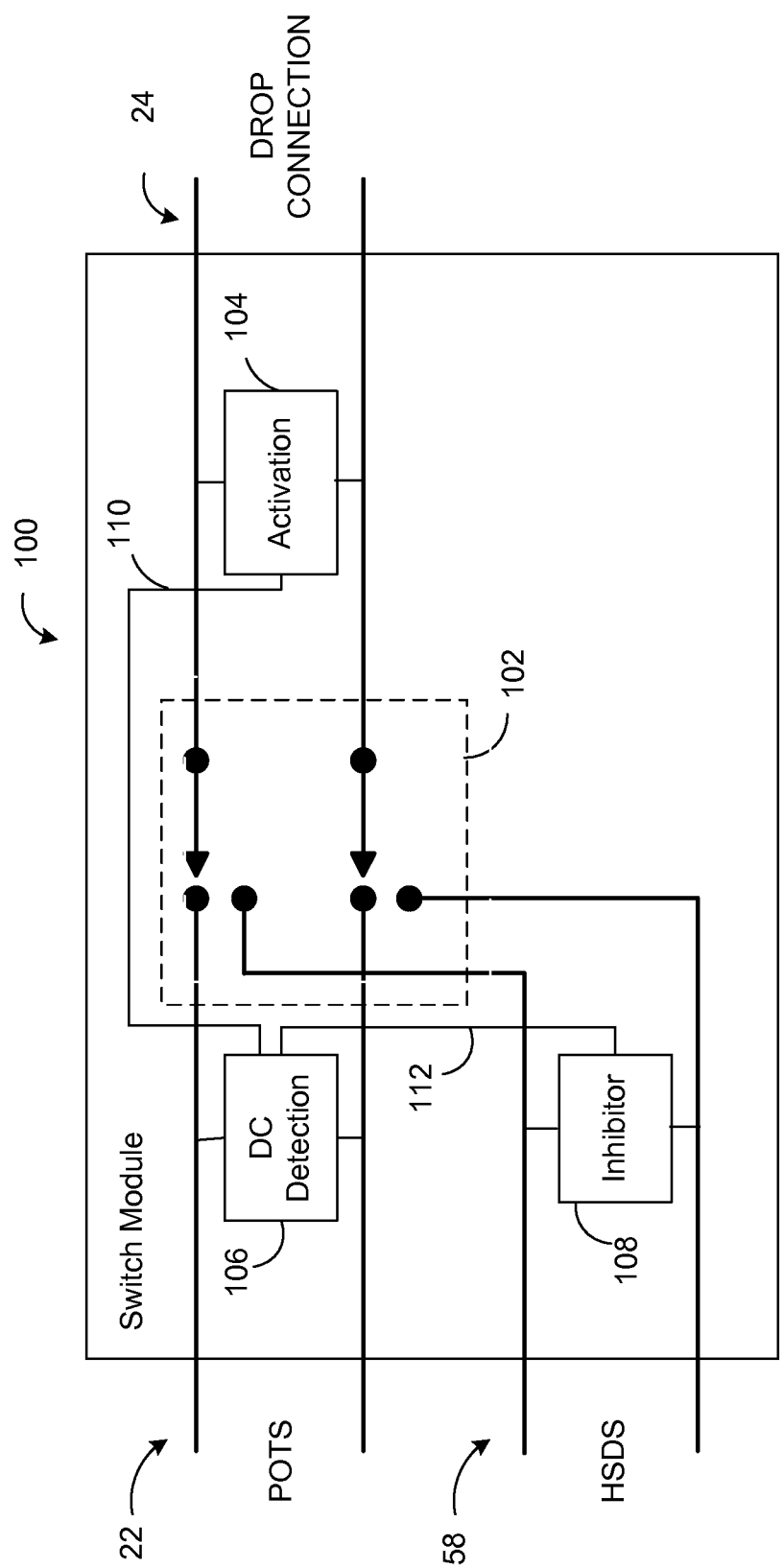
FIG. 3 is a block diagram showing an embodiment of a switch module from the distribution point of FIG. 2.

FIG. 3 shows an embodiment of a switch module used to switch the connectivity of the drop connection between POTS service and high-speed data service (HSDS). The switch module 100 can include a latching relay 102 to selectively connect the drop connection 24 to either the POTS line 22 or the HSDS output line 58. The latching relay 102 can include a first port to connect to the drop connection 24, a second port to connect to the POTS line 22 and a third port to connect to the HSDS output line 58. In a first state of the latching relay 102, a first coil in the latching relay 102 can be energized to connect the drop connection 24 to the HSDS output line 58. In a second state of the latching relay 102, a second coil in the latching relay 102 can be energized to connect drop connection 24 to the POTS line 22. An activation circuit 104 can be used to energize the first coil and a DC detection circuit 106 can be used to energize the second coil. In one embodiment, the latching relay 102 can include two (2) form C contacts. However in other embodiments, the latching relay 102 can include other numbers, e.g., four (4), of form C contacts.

The activation circuit 104 can be connected to (or between) tip and ring of the drop connection 24. The activation circuit 104 can include a capacitor in series with a high value resistor, e.g., 1 MΩ, and the capacitor can store a charge of sufficient voltage, e.g., 10 V, to energize the first coil. In one embodiment, the capacitor in the activation circuit 104 can have a capacitance, e.g., about 10 µF, to store adequate energy to change the latching relay state, and the capacitor can be isolated from the drop connection 24 by the resistor. The high impedance from the resistor in series with the capacitor can result in the capacitor being charged by drawing very small amperage, i.e., micro amps, from the drop connection 24 when the drop connection 24 is connected to the POTS line 22 and the POTS line 22 is active, i.e., has a voltage across the line. Due to the small amount of current drawn by the activation circuit 104, the presence of the activation circuit 104 is transparent to the devices communicating across the drop connection 24. In other words, there is not a significant reduction in the power of the signals carried by the drop connection 24. The capacitor in the activation circuit 104 can also be charged by the HSDU 28 connected to the drop connection 24 as will be discussed with respect to FIG. 4. The activation circuit 104 can be configured to detect an activation signal such as a short circuit, i.e., a near zero (0) voltage, or a voltage less than a predetermined threshold voltage across tip and ring of the drop connection 24. In other embodiments, the activation signal can be any suitable signal from the HSDU 28 that results in the activation circuit 104 switching the latching relay to the first state. In addition, the activation circuit 104 can provide an inhibit signal to the DC detection circuit 106 on line 110 that prevents the DC detection circuit 106 from energizing the second coil for a predetermined time period, e.g., 5 seconds, in response to the detection of the short circuit across the drop connection 24.

The DC detection circuit 106 can be connected to (or between) tip and ring of the POTS connection 22. The DC detection circuit 106 can include a capacitor (in series with a high value resistor) that can store a charge to energize the second coil. The capacitor in the DC detection circuit 106 can be charged by drawing very small amperage, i.e., micro amps, from the POTS line 22 when the POTS line 22 is active. The DC detection circuit 106 can be configured to detect a voltage, e.g., 48 V, across the POTS line 22.

The switch module 100 can also include an inhibitor circuit 108. The inhibitor circuit 108 can be connected to (or between) output lines 58. The inhibitor circuit 108 can provide an inhibit signal to the DC detection circuit 106 on line 112 that prevents the DC detection circuit 106 from energizing the second coil. The inhibitor circuit 108 can include an opto-isolator and can be configured to detect the presence of a back voltage on the output line 58 from the HSDU 28. In another embodiment, the inhibitor circuit 108 can be incorporated into the activation circuit 104.

Figure 4:
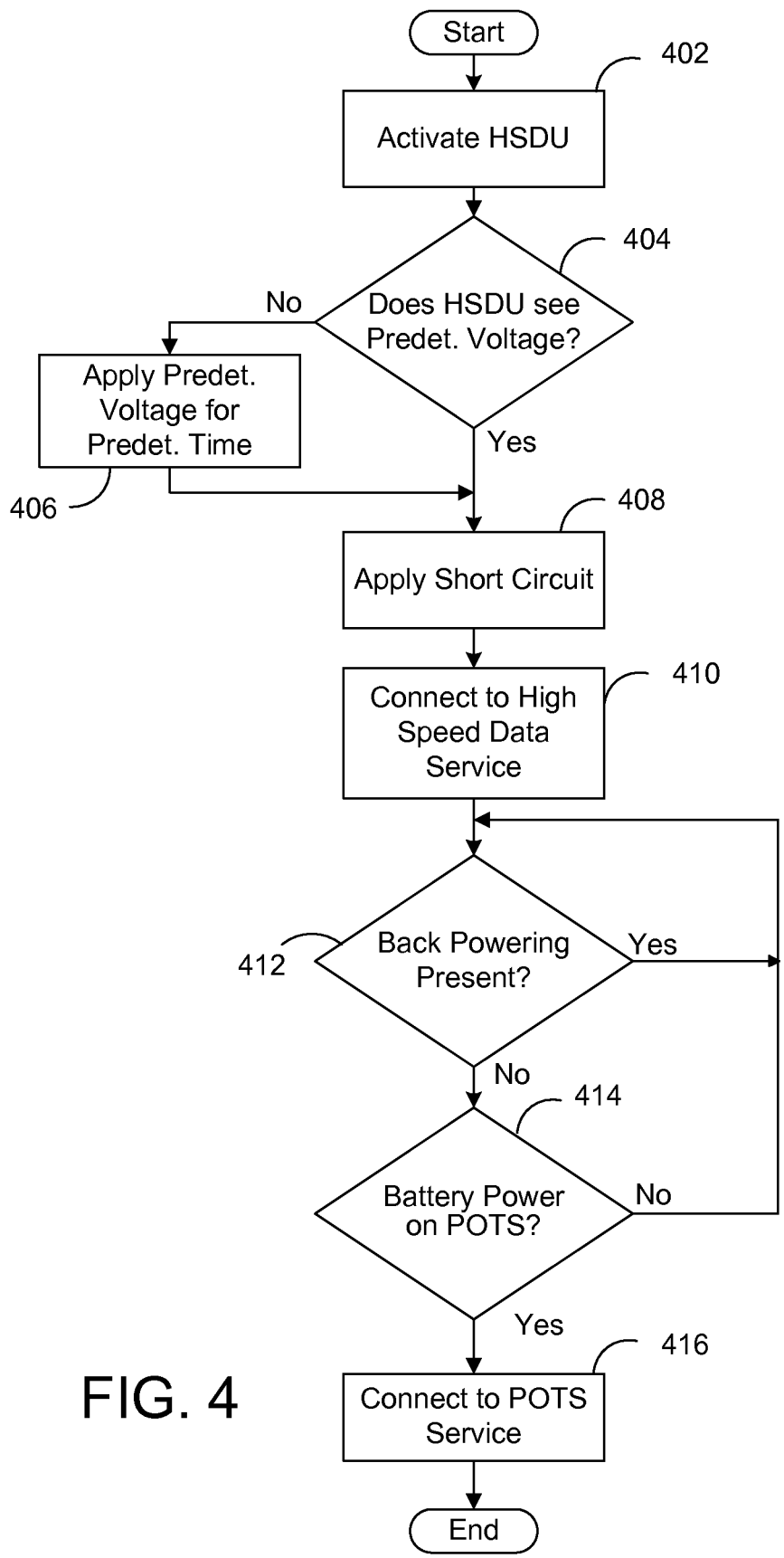
FIG. 4 is a flowchart showing an embodiment of a process for controlling the switch module to switch between POTS and high-speed data service.

FIG. 4 is a flowchart showing an embodiment of a process for controlling the switch module to switch between POTS and high-speed data service. The process begins with a user connecting an HSDU 28 to the drop connection 24 and activating the HSDU 28 (step 402). The HSDU 28 then checks the drop connection 24 to determine if a DC power signal of at least a predetermined voltage, e.g., 48 V, from the network 16 is present on the drop connection 24 (step 404). The HSDU 28 checks for the predetermined voltage on the drop connection 24 from the POTS line 22 to determine whether the capacitor in the activation circuit 104 is likely charged by the power signal from the network 16 and can energize the first coil in the latching relay 102. If the HSDU 28 determines that the predetermined voltage is not present on the drop connection 24, the HSDU 28 can apply a DC power signal of a predetermined voltage, e.g., 48 V, to the drop connection 24 for a predetermined time period, e.g., 10 seconds, (step 406) in order to charge the capacitor in the activation circuit 104 so the capacitor can energize the first coil in the latching relay 102. After the HSDU 28 has charged the capacitor in the activation circuit 104 or determined that the capacitor in the activation circuit 104 is likely already charged (a determination based on the presence of the predetermined voltage from the POTS line 22), the HSDU 28 can apply a short circuit across the drop connection 24 (step 408) for a predetermined time period, e.g., 5 seconds, to generate the activation signal to switch the latching relay 102 to connect to the HSDS lines 58. In one embodiment, the HSDU can short tip and ring of the drop connection 24 by activating a switch to electrically connect tip to ring.

When the HSDU 28 applies the short circuit across the drop connection 24, i.e., applies the activation signal, the activation circuit 104 can detect the short circuit and can energize the first coil in latching relay 102 using the capacitor in the activation circuit 104. In one embodiment, the activation circuit 104 can look for a voltage across the drop connection 24 that is less than a predetermined threshold voltage, e.g., 1 V. The use of the short circuit as an activation signal permits the activation circuit to detect the activation signal without the need for power from the POTS line 22. The activation circuit 104 can have a low power detection circuit that is activated by the short circuit, i.e., the near-zero voltage, across the drop connection 24. In the low power detection circuit, the short circuit or near-zero voltage can turn off a transistor that permits a "detection circuit" capacitor (that is different from the capacitor used to energize the first coil) to be energized from the current from the short circuit. The "detection circuit" capacitor can then be used to turn on a silicon controlled rectifier (SCR) to pulse current from the capacitor to energize the first coil. The energizing of the first coil in the latching relay 102 can connect the drop connection 24 to the HSDS output line 58 (step 410). Once the drop connection 24 is connected to the HSDS output line 58, the HSDU 28 can provide back power or reverse power to the service unit 50 and/or other components of the DP 18 without risk of damaging components at the network facility 14 by inadvertently providing back power over the POTS lines 22. Additional information regarding the operation and powering of the service unit used in the present application is described in commonly-assigned U.S. Pat. No. 8,861,554, entitled "Systems and Methods for Powering a Service Unit," and granted on Oct. 14, 2014, which is incorporated herein by reference. In one embodiment, the HSDU 28 can check for an absence of current or 48 V at the HSDU 28 to confirm that the latching relay 102 has completed the switch to the HSDS output line 58 before attempting to provide back power to the service unit 50.

The inhibitor circuit 108 can then check for the presence of back power on the output line 58 (step 412). In another embodiment, a predetermined time delay, e.g., 3-7 seconds, can be imposed between step 410 and step 412 to provide the HSDU 28 with sufficient time to apply back power and to avoid false or premature determinations of no back power being present. If the inhibitor circuit 108 determines that back power is present on the output line 58, the inhibitor circuit 108 provides an inhibit signal to the DC detection circuit 106. The inhibit signal prevents the DC detection circuit 106 from energizing the second coil in the latching relay 102 and the process returns to step 412 for another determination of whether there is back power on the output line 58. If there is no back power present on the output line 58, the DC detection circuit 106 checks for battery power or a predetermined voltage, e.g., 48 V, on POTS line 22 (step 414). If there is no battery power on the POTS line 22, the process returns to step 412 for another determination of whether there is back power on the output line 58. In another embodiment, the DC detection circuit 106 can check for a voltage on POTS line 22 greater than a predetermined voltage, e.g., 34 V.

If there is a power signal on POTS line 22 and no inhibit signal from the inhibitor circuit 108 (indicating no back power on output line 58) nor the activation circuit 104 (indicating no activation signal being received within a predetermined time period), the DC detection circuit 106 can energize the second coil in latching relay 102 using the capacitor in the DC detection circuit 106 to switch the drop connection 24 back to the POTS line 22 and provide the user with voice service since the high-speed data service is not able to be used. The energizing of the second coil in the latching relay 102 can connect the drop connection 24 to the POTS line 22 (step 416).

In another embodiment, a low powered microprocessor or low power digital circuits (e.g., a field programmable gate array) can be used to detect an activation signal from the HSDU 28 and to control the switching of the drop connection 24 between the POTS line 22 and the output line 58. The microprocessor (or digital circuits) can be powered by drawing very small amperage, i.e., micro amps, from the POTS line 22. The microprocessor can incorporate a state machine and simple programming to detect for the short circuit on the drop connection 24, or other activation signal, e.g., 13 dial pulses, and to change the connection of the drop connection 24 from the POTS line 22 to the output line 58.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A distribution point comprising:
   a first connection connected to a distribution point for receiving a first service from the distribution point;
   a second connection connected to the distribution point for receiving a second service different from the first service from the distribution point;
   a third connection connected to a unit located at a customer premises;
   a switch module, the switch module having a first state for connecting the first connection and the third connection and a second state for connecting the second connection and the third connection, the switch module comprising:
   a detection circuit connected to the third connection, the detection circuit configured to detect an activation signal from the customer premises unit, the detection circuit configured to transition the switch module from the first state to the second state in response to receiving the activation signal from the customer premises unit;
   the detection circuit comprising a power source configured to provide energy to transition the switch module from the first state to the second state; and
   the power source configured to store energy drawn from either the first connection or the third connection.

2. The distribution point of claim 1, wherein the switch module further comprises:
   the detection circuit is a first detection circuit and the power source is a first power source;
   a second detection circuit connected to the first connection, the second detection circuit configured to detect a voltage across the first connection, the second detection circuit configured to transition the switch module from the second state to the first state in response to detecting the voltage across the first connection and an absence of an inhibit signal at the second detection circuit;
   the second detection circuit comprising a second power source, the second power source configured to provide energy to transition the switch module from the second state to the first state; and
   the second power source configured to store energy drawn from the first connection.

3. The distribution point of claim 1, wherein the activation signal is indicative of a short circuit condition across at least two wires of the third connection.

4. The distribution point of claim 1, wherein the power source is configured to store energy drawn from the third connection in response to an absence of voltage on the first connection, and wherein the customer premises unit is configured to provide a voltage at the third connection.

5. The distribution point of claim 1, wherein the activation signal is indicative of a short circuit across the third connection, the short circuit across the third connection being generated by the customer premises unit.

6. The distribution point of claim 1, wherein the switching module comprises a latching relay.

7. The distribution point of claim 1, wherein the activation signal is a voltage and the detection circuit receives the activation signal when the voltage detected across the third connection is less than a predetermined threshold voltage.

8. The distribution point of claim 2, wherein the switch module further comprises a third detection circuit connected to the second connection, the third detection circuit configured to detect back power from the customer premises unit, the third detection circuit configured to provide an inhibit signal to the second detection circuit in response to detecting back power from the customer premises unit.

9. The distribution point of claim 2, wherein the first detection circuit is configured to provide an inhibit signal to the second detection circuit in response to receiving the activation signal.

10. The distribution point of claim 6, wherein the power source is a capacitor and the capacitor is configured to energize a coil in the latching relay to transition the latching relay from the first state to the second state.

11. A method of switching a customer premises from receiving a first service over a drop connection to receiving a second service over the drop connection, the method comprising:
    connecting equipment to a drop connection at a customer premises, the drop connection being connected to a first line by a switch module located at a distribution point separate from the customer premises, the first line providing a first service to the customer premises over the drop connection;
    applying a short circuit to the drop connection with the equipment;
    detecting the short circuit on the drop connection with an activation circuit connected to the drop connection;
    connecting the drop connection to a second line with the switch module in response to the detection of the short circuit using energy stored in the activation circuit, the second line providing a second service to the customer premises over the drop connection; and
    applying back power to at least one component of the distribution point with the equipment in response to the drop connection being connected to the second line.

12. The method of claim 11, further comprising:
    detecting a predetermined voltage on the first line with a direct current (DC) detection circuit connected to the first line; and
    connecting the drop connection to the first line with the switch module in response to the detection of the predetermined voltage using energy stored in the DC detection circuit.

13. The method of claim 11, further comprising storing energy in the activation circuit by drawing current from the drop connection.

14. The method of claim 11, further comprising:
    detecting a first predetermined voltage on the drop connection by the equipment prior to applying the short circuit to the drop connection; and
    applying a second predetermined voltage to the drop connection by the equipment in response to an absence of the first predetermined voltage on the drop connection, the second predetermined voltage being used to provide the energy to the activation circuit.

15. The method of claim 11 wherein said connecting the drop connection to a second line includes energizing a coil in a latching relay of the switch module with the energy from the activation circuit.

16. The method of claim 12, further comprising:
    detecting back power on the second line with an inhibitor circuit connected to the second line; and
    providing an inhibit signal to the DC detection circuit by the inhibitor circuit in response to the detection of back power on the second line, the inhibit signal preventing the DC detection circuit from connecting the drop connection to the first line.

17. The method of claim 12, further comprising providing an inhibit signal to the DC detection circuit by the activation circuit in response to the detection of a short circuit on the drop connection, the inhibit signal preventing the DC detection circuit from connecting the drop connection to the first line.

18. The method of claim 12, further comprising storing energy in the DC detection circuit by drawing current from the first line.

19. The method of claim 12, wherein said connecting the drop connection to the first line includes energizing a coil in a latching relay of the switch module with the energy from the DC detection circuit.

20. A telecommunication system, comprising:
   a service unit coupled to a network for receiving a high-speed data stream from the network, the service unit configured to transmit data from the high-speed data stream across a plurality of subscriber lines to customer premises equipment (CPE) at one or more customer premises, one of the subscriber lines having a drop connection;
   a switch module coupled to the drop connection and to a plain old telephone system (POTS) line for carrying POTS signals, the switch module configured to electrically connect the POTS line to the drop connection in a first state and to electrically connect the service unit to the drop connection in a second state, the switch module having a power source for drawing power from the POTS line, wherein the switch module is configured to use the power from the power source to transition from the first state to the second state in response to a signal from the CPE.

21. The system of claim 20, wherein the switch module is configured to sense a short circuit between tip and ring of the drop connection and to detect the signal based on the short circuit.

22. The system of claim 20, wherein the switch module is configured to determine whether the switch module is receiving a power signal from the CPE, and the switch module is configured to transition from the second state to the first state in response to a determination that the switch module is not receiving the power signal from the CPE.

23. The system of claim 20, wherein the service unit is configured to transmit the data across the plurality of subscriber lines using digital subscriber line (DSL) protocols.

\* \* \* \* \*